3,767,718
FORMATION OF BICYCLOOLEFINS
Marvin M. Johnson, Donald C. Tabler, and Gerhard P. Nowack, Bartlesville, Okla., assignors to Phillips Petroleum Company
No Drawing. Continuation of abandoned application Ser. No. 8,073, Feb. 2, 1970. This application Jan. 12, 1972, Ser. No. 217,255
Int. Cl. C07c 13/44
U.S. Cl. 260—666 PY     7 Claims

ABSTRACT OF THE DISCLOSURE

A method for the formation of bicycloolefins from cycloalkadienes which involves contacting the cycloalkadiene with hydrogen in the presence of a reduced tungsten-arsenic catalyst, preferably on a support.

---

This application is a continuation of Ser. No. 8,073, filed Feb. 2, 1970, and now abandoned.

This invention pertains to the production of bicycloolefins.

In one of its more specific aspects, this invention pertains to the formation of bicycloolefin from monocyclic dienes by the employment of a tungsten-arsenic catalyst.

The use of catalyst systems comprising tungsten is well known. Such systems are commonly employed for hydrocracking high boiling hydrocarbon feedstocks to produce low boiling hydrocarbons. Frequently, arsenic compounds have been used within the system for the purpose of controlling the activity of such processes.

It has now been discovered that by employing a system in which both tungsten and arsenic are components of a supported catalyst, a cyclic diolefin can be reacted in the presence of hydrogen to form an isomerized product which contains the same number of carbon atoms, but which has a different structural configuration, and a hydrogenated product which is a monoene of the same carbon skeleton as the feed. The method of this invention provides such a process.

According to the method of this invention there is provided a process for the bicyclization of a cycloalkadiene which comprises passing a cycloalkadiene in contact with hydrogen and a supported catalyst comprising tungsten and arsenic to produce a bicycloolefin and recovering the bicycloolefin.

Among the cycloalkadienes which can be employed in this invention are 1,3-cyclooctadiene, 1,4-cyclooctadiene, 1,5-cyclooctadiene, 1,3-cycloheptadiene, 1,5-cyclononadiene, 1,4-cyclodecadiene, 1,5-cyclododecadiene, 1,3-cyclododecadiene and 1,4-cycloundecadiene.

In one of its embodiments, the method of this invention contemplates the conversion of 1,5-cyclooctadiene to cyclooctene and bicyclo[3·3·0]octene-2, by contacting the 1,5-cyclooctadiene with hydrogen in the presence of a tungsten-arsenic supported catalyst.

Accordingly, it is an object of this invention to provide bicyclic derivatives of cycloalkadienes.

It is another object of this invention to provide a method of producing bicyclo[3·3·0]octene-2 and cyclooctene.

The method of this invention contemplates the use of a tungsten-arsenic catalyst on a suitable solid support. Any suitable material conventionally employed as a catalyst support can be used. It is only necessary that the support be one on which the tungsten and arsenic can be deposited. Suitable supports are gamma-alumina, alpha-alumina, calcium aluminate, silica, charcoal and the like, or mixtures thereof. Preferably, the support will have a surface area of from abuot 50 to about 200 m.²/gm. Preferably, the tungsten and arsenic will be present in their supported states in a mole ratio of from about 4 to 1 to about 0.5 to 1, respectively, preferably from about 3.5 to about 2.5 moles of tungsten per mole of arsenic. In turn, tungsten and arsenic will be present on the support in a total amount from about 3 to about 15 weight percent of the support.

The method of this invention contemplates contacting the cycloalkadiene with the tungsten-arsenic catalyst, preferably in the presence of an inert organic solvent such as cyclohexane, n-hexane, n-heptane and the like, from which the product is easily separable by distillation and other conventional methods. The cycloalkadiene is passed, either as a liquid or as a gas, in contact with the catalyst in the presence of suitable quantities of the diluent and hydrogen such that the feed rate of the cycloalkadiene is from about 0.1 to about 20 volumes per volume of catalyst per hour and preferably from about 1 to about 6 volumes per volume per hour. Hydrogen is introduced into the reaction zone in an amount from about 1 to about 15 moles per mole of cycloalkadiene. Reaction temperatures are maintained at from about 200 to about 600° F. at pressures from about 100 to about 1,000 p.s.i.g.

The catalyst of this invention can be prepared in a number of ways. Preferably, its method of preparation involves impregnating the support with an aqueous solution containing a compound of tungsten, drying, recovering the solid and impregnating the solids with an aqueous solution containing a compound of arsenic and drying the solids to recover the catalyst which is then activated at temperatures of about 800° to 1000° F. in a reducing atmosphere. If necessary, the catalyst is treated by calcination in air to convert the tungsten and arsenic compounds to forms readily reducible with hydrogen prior to the reduction.

The method of preparing a catalyst and its employment in the process of this invention are illustrated in the following examples.

EXAMPLE I

One catalyst employable in the method of the present invention was prepared by adding 60 ml. of concentrated ammonium hydroxide solution (assay 28 to 30 weight percent $NH_3$) to 13.6 grams of tungstic acid ($H_2WO_4$). Distilled water was added to bring the total volume to 175 ml. and the mixture was brought to a temperature approximating its boiling point to dissolve the tungstic acid.

About 50 ml. of the resulting solution were then mixed with 90 grams of 10 to 40 mesh alumina granules, and the mixture was dried, first at room temperature, and then by heating in a forced-draft oven at about 220° F.

The dry solid was cooled, mixed with another portion of the solution, and dried agin, as above. This procedure was repeated until all of the solution had been added to the alumina. Thereafter the solid was dried, heated in a stream of air at a temperature of 950° F. for about 2 hours, cooled and screened. Four and five-tenths (4.5) grams of particles smaller than 50 mesh were removed and discarded. Ninety-seven and six-tenths (97.6) grams of particles larger than 50 mesh were reimpregnated with 2.7 grams of arsenic acid ($N_3AsO_4$) dissolved in 50 ml. of water. Thereafter, the mixture of solution and particles was evaporated to dryness and a solid containing 8.6 weight percent tungsten and 1.5 weight percent arsenic was recovered. This solid was then activated at 1000° F. by passing hydrogen at one atmosphere pressure in contact with it for a period of about five hours to produce the catalyst employed in Example III.

EXAMPLE II

An alternate procedure for preparing the catalyst is as follows.

A solution of 15.3 grams of $(NH_4)_2W_4O_{13} \cdot 8H_2O$ dissolved in 30 ml. of deionized water is mixed with a solution of 2.6 grams of $H_3AsO_4$ in 20 ml. of water and 20 ml. of 28 percent ammonia solution. A clear solution results.

This clear solution is poured over 90 grams of 10–40 mesh alumina which absorbs most of the solution. The resulting mixture is evaporated to dryness and the dried solid is heated at 950° F. for two hours. This solid is then reduced in hydrogen at 800° F. for 4½ hours to yield a catalyst having a tungsten content of 10.0 weight percent and an arsenic content of 1.3 weight percent, and suitable for the method of this invention.

EXAMPLE III

The catalyst prepared in Example I in an amount of 40 grams was placed as a fixed bed in a reactor. A feed comprising 10 weight percent 1,5-cyclooctadiene and 90 percent n-pentane was passed through the bed in contact with the catalyst at the rate of 78 g. per hour. Eighty-five hundredths (0.85) s.c.f.h. hydrogen was introduced with the feed, this amount of hydrogen being equivalent to a 15 to 1 hydrogen to cyclooctadiene mole ratio. The reactor system was maintained at a temperature of 350° F. and a pressure of 200 p.s.i.g. The product stress was recovered and on a pentane-free basis had the following anaylsis:

| Component: | Product analysis, pentane-free basis, weight percent |
|---|---|
| 1,3-cyclooctadiene | 0.5 |
| Bicyclo[3.3.0]octane-2 | 59.2 |
| Vinylcyclohexene | 5.62 |
| 3,3,0-bicyclooctane | 0.5 |
| Cyclooctene | 33.2 |

The above data illustrates the operability of the method of this invention. It also illustrates that the catalyst of this invention produces an unexpectedly large production of the bicyclo product with an unexpectedly small conversion to cyclooctene.

The above data clearly establish the effectiveness of the catalyst and method of this invention in forming bicycloolefins from cycloalkadienes. These data further establish the capabilities of this catalyst and of the method of this invention for the selective conversion of 1,5-cyclooctadiene to cyclooctene and to bicyclo[3·3·0]octene-2, with the bicyclo component being the major product.

It will be evident from the foregoing that various modifications can be made to the method of this invention. Such, however, are within the scope of the invention.

What is claimed is:

1. A process for the production of bicyclo[3·3·0] octene-2 which comprises contacting 1,5-cyclooctadiene at a temperature in the range of from about 200 to about 600° F. with hydrogen and a reduced tungsten-arsenide on alumina catalyst and recovering bicyclo[3·3·0]octene-2 thus produced, the total amount of tungsten and arsenic present in said catalyst ranging from about 3 to about 15 weight percent of the alumina.

2. The process of claim 1 in which said 1,5-cyclooctadiene is contacted with said hydrogen and said catalyst in the presence of a diluent, said 1,5-cyclooctadiene being contacted at a rate within the range of from about 0.1 to about 20 volumes per volume of catalyst per hour, said hydrogen being present in an amount within the range of from of from about 1 to about 15 moles per mole of said 1,5-cyclooctadiene.

3. The process of claim 1 in which the mole ratio of tungsten to arsenic present in said catalyst is in the range of from about 4 to 1 to about 0.5 to 1.

4. The process of claim 1 in which said catalyst is tungstic acid on alumina further treated with arsenic acid activated by heating in hydrogen at about 1000° F.

5. The process of claim 1 in which said catalyst is prepared by reduction of tungstic acid and arsenic acid deposited on alumina by heating in the presence of hydrogen at a temperature of from about 800 to about 1000° F.

6. The process of claim 1 in which said catalyst is prepared by depositing ammonium tungstate and arsenic acid on alumina by heating in the presence of hydrogen at a temperature of from about 800 to about 1000° F.

7. The process of claim 6 in which said ammonium tungstate is formed by the interaction of ammonium hydroxide and tungstic acid in contact with alumina.

References Cited
UNITED STATES PATENTS

| 3,250,818 | 5/1966 | Cannell | 260—666 |
| 2,608,534 | 8/1952 | Fleck | 260—683.2 |

OTHER REFERENCES

H. J. Emeléus et al., Modern Aspects of Inorganic Chemistry, Van Nostrand, 1952, pp. 207, 209 and 216–217.

DELBERT E. GANTZ, Primary Examiner

V. O'KEEFE, Assistant Examiner

U.S. Cl. X.R.

260—666 A, 683.2